United States Patent

Marsh et al.

[11] Patent Number: 4,809,660
[45] Date of Patent: Mar. 7, 1989

[54] ENGINE SPARK TIMING CONTROL FOR TORQUE MANAGEMENT OF A MOTOR VEHICLE DRIVETRAIN

[75] Inventors: Richard A. Marsh, Birmingham, Mich.; Gary J. Brand, Irvine, Calif.; David C. Poirier, Troy, Mich.; Dale L. Phillips, Dearborn, Mich.; Sami M. Hamade, Ann Arbor, Mich.

[73] Assignee: General Motors Corporation, Detroit, Mich.

[21] Appl. No.: 158,186

[22] Filed: Feb. 19, 1988

[51] Int. Cl.$^4$ ................................................ F02P 5/15
[52] U.S. Cl. .................................. 123/417; 123/418; 74/859; 364/431.03
[58] Field of Search ................ 123/415, 416, 417, 418, 123/419, 425, 435, 436; 74/856, 859, 860, 872; 364/431.03, 431.04, 431.08

[56] References Cited

U.S. PATENT DOCUMENTS

| | | | |
|---|---|---|---|
| 4,509,477 | 4/1985 | Takao et al. | 123/417 X |
| 4,630,583 | 12/1986 | Suzuki et al. | 74/860 X |
| 4,713,763 | 12/1987 | Hofmann | 74/859 X |
| 4,718,014 | 1/1988 | Kobayshi et al. | 123/416 X |
| 4,730,587 | 3/1988 | Norota et al. | 123/416 |
| 4,774,922 | 10/1988 | Morita | 123/425 |

Primary Examiner—Willis R. Wolfe
Attorney, Agent, or Firm—Mark A. Navarre

[57] ABSTRACT

An engine spark timing control system and method for addressing various engine output torque constraints. Preignition and knock concerns are addressed according to the conventional practice of calibrating spark control table, and the most limiting of the drivetrain-related torque constraints is referenced to such table to determine the additional retard, if any, required to satisfy such constraint. With this control, the preignition spark control table or any of the drivetrain-related torque constraints may be changed at will without violating the other constraints or calibrations.

6 Claims, 6 Drawing Sheets

ENGINE SPARK TIMING CONTROL FOR TORQUE MANAGEMENT OF A MOTOR VEHICLE DRIVETRAIN

This invention relates to motor vehicle drivetrain control, and more particularly to an engine spark timing control for strategically limiting the engine output torque in accordance with drivetrain torque constraints.

BACKGROUND OF THE INVENTION

Complications in the design of a motor vehicle drivetrain and its control sometimes result in various performance related compromises. Fortunately however, increased sophistication in engine controls (primarily spark timing and fuel) have enabled the performance compromises to be applied strategically. Spark timing, for example, is normally calibrated to maximize engine output torque, but is variably retarded from the maximum torque setting (referred to herein as the MBT setting) to avoid preignition and knock with fuels of the recommended octane rating. Spark retard may also be employed to meet drivetrain-related torque constraints.

In implementing controls of the above type, the goal is to avoid operating conditions which might damage the drivetrain or degrade the drivability of the vehicle, while maximizing performance and/or economy. However, the control tends to become unduly complicated and changes made to one part of the control often adversely affect another part of the control. For example, if an engine-related change permits the calibration engineer to advance the spark timing under certain operating conditions, the increased engine output torque may degrade the transmission shift quality or exceed a drivetrain torque limit. The opposite situation may also occur.

SUMMARY OF THE PRESENT INVENTION

The present invention is directed to an improved engine spark timing control for addressing the various engine output torque constraints. Preignition and knock concerns are addressed according to the conventional practice of calibrating a spark control table. The most limiting of the drivetrain-related torque constraints is identified and referenced to the calibrated retard to determine the additional retard, if any, required to satisfy such constraint. With this control, the preignition spark control table or any of the drivetrain-related torque constraints may be changed at will without violating the other constraints or calibrations.

One key to the control of this invention is the recognition that, at least under high engine torque conditions, there is a relatively simple, speed independent, relationship between the amount of spark retard from the MBT setting and the resulting engine torque reduction from that which would be obtained at the MBT spark setting. Another key is the recognition that the engine torque obtained at the MBT spark setting (i.e., MBT torque) may be simply and reliably computed as a function of various engine operating parameters. A further key is the recognition that information concerning the engine torque loss caused by preignition calibrations is available for control purposes. Such information is customarily generated during engine testing (as a function of engine speed) and may be used to identify the torque reduction from MBT inherent in the preignition calibration.

The control of this invention is founded on the recognition that the need for torque management typically arises only under maximum or near-maximum torque conditions, and that the key items indicated above may be advantageously used to relate the various constraints and calibrations to the amount of retard from the MBT spark setting and the amount of torque reduction from MBT.

The control is carried out by comparing the various drivetrain-related torque constraints to identify the most limiting constraint in terms of an absolute engine torque limit which should not be exceeded. Such torque limit, in turn, is compared with the computed MBT brake torque to define an overtorque value corresponding to the amount by which the engine brake torque must be reduced from the MBT brake torque in order to satisfy the torque limit. The predefined torque/retard relationship, in turn, relates the overtorque to an overtorque spark retard that represents the amount of retard from the MBT spark setting which would be required to reduce the MBT brake torque by the amount of the overtorque. Next, the retard from MBT, if any, contained in the spark calibration as a result of preignition and detonation constraints is determined. The torque management control then additionally retards the spark timing by a supplemental retard amount determined according to the amount, if any, by which the overtorque retard exceeds the calibrated retard from MBT, thereby matching the engine torque to the most limiting of the preignition and drivetrain-related constraints.

With the control method of this invention, unwanted interactions among the various performance and drivability constraints are eliminated. Changes may be made to the preignition spark control table or any of the various drivetrain-related torque constraints without adversely affecting another constraint. The result is an improved torque management control for achieving strategic engine torque reductions with a simple mechanization.

DETAILED DESCRIPTION OF THE DRAWINGS

Figure 1:
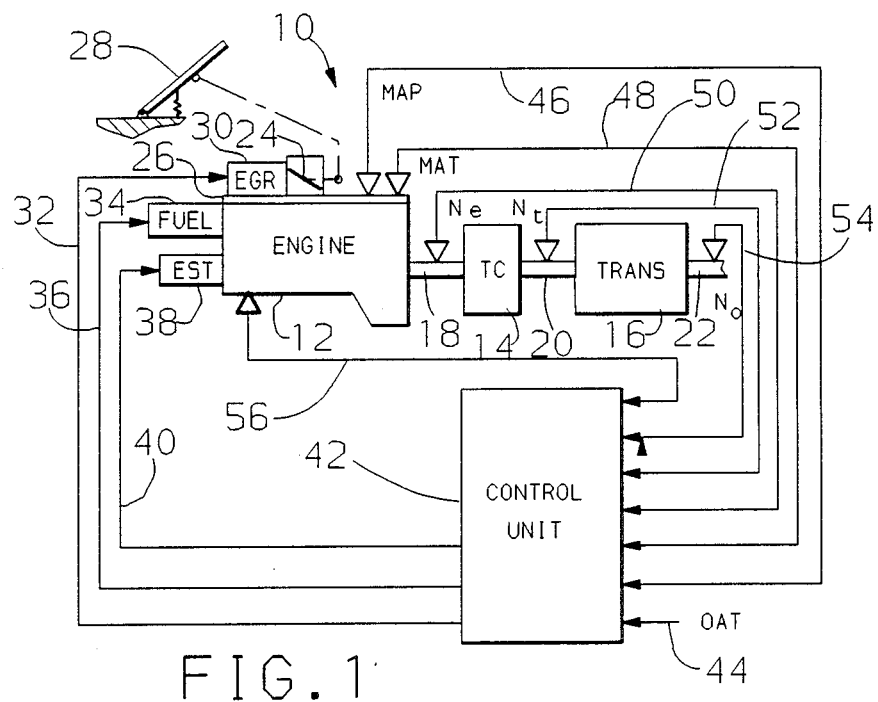
FIG. 1 is a schematic diagram depicting a motor vehicle drivetrain including a spark ignition internal combustion engine and a computer-based engine control unit.

Referring to FIG. 1, the reference numeral 10 generally designates a motor vehicle drivetrain comprising a spark ignition internal combustion engine (ENGINE) 12, a fluidic torque converter (TC) 14 and a conventional hydraulic automatic transmission (TRANS) 16.

The engine output shaft 18 drives the input member (impeller) of torque converter 14, the output member (turbine) of torque converter 14 drives the transmission input shaft 20, and the transmission output shaft 22 drives the vehicle wheels for propelling the vehicle.

A throttle 24 controls the ingestion of combustion air through the engine intake manifold, schematically designated by the reference numeral 26. The throttle 24 is positioned in a conventional manner by an operator-manipulated accelerator pedal 28, as indicated. An exhaust gas recirculation (EGR) actuator 30 additionally returns a controlled amount of the exhaust gases to the manifold 26 in accordance with an EGR control signal on line 32. Engine fueling is controlled by a conventional fuel injection apparatus generally designated by the reference numeral 34 in accordance with a fuel pulse width signal on line 36.

The engine ignition function is carried out with a conventional spark ignition system (not shown) which cooperates with a conventional electronic spark timing (EST) unit 38 to initiate combustion in the various engine cylinders in accordance with a spark timing signal on line 40. As per conventional practice, the spark timing signal on line 40 designates the desired timing of the spark ignition relative to the top-dead-center (TDC) crank position for each of the engine cylinders. The ignition is typically desired prior to the TDC position and is calibrated in terms of engine crank angle degrees before top-dead-center (BTDC).

The EGR control signal, the fuel pulse width signal, and the spark timing signal are generated by a computer-based engine control unit 42 in a predetermined manner in accordance with various operating parameters of the drivetrain 10. Such parameters are sensed with conventional transducers and provided as inputs to control unit 42 via lines 44-56. The sensed parameters include the outside air temperature OAT (line 44), the engine manifold absolute pressure MAP (line 46), the engine manifold air temperature MAT (line 48), the engine speed $N_e$ (line 50), the torque converter output (turbine) speed Nt (line 52), the transmission output speed $N_o$ (line 54), and the engine coolant temperature $C_t$ (line 56). The control unit 42 may be mechanized with a conventional, state-of-the-art microcomputer controller, including a central processing unit, memory and input/output devices.

Figure 2:
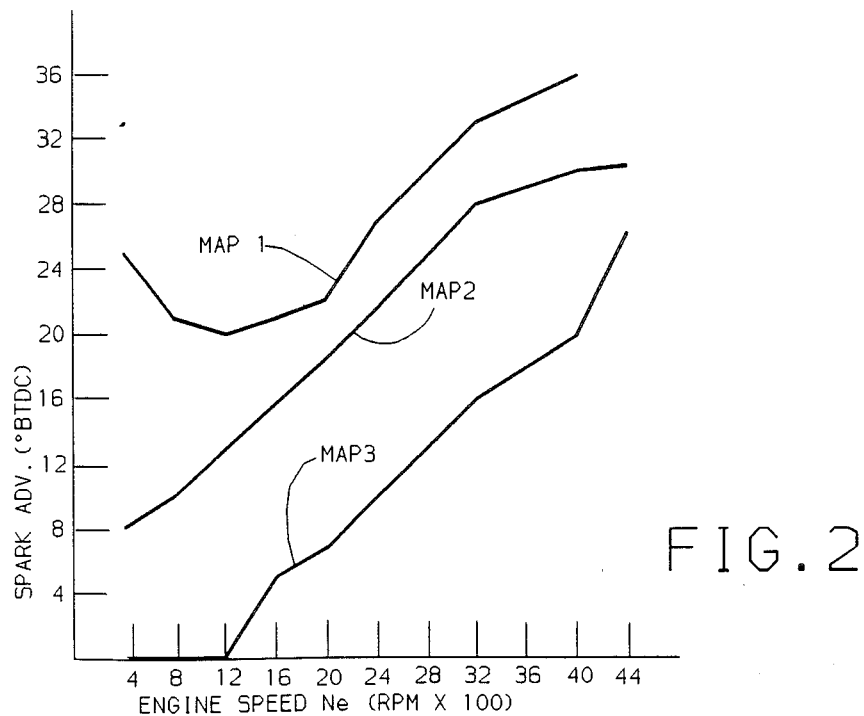
FIG. 2 is a graphical representation of a typical preignition spark calibration table for a spark ignition engine as shown in FIG. 1.

As indicated above, the spark timing of an engine is generally calibrated to satisfy performance and drivability considerations for the various combinations of speed and load. Typically, the timing is calibrated as close as possible to the MBT setting (for maximizing engine output torque) without causing preignition or detonation with fuels of the recommended octane rating. The result is a three-dimensional electronic look-up table in which the calibrated timing values are stored as a function of engine speed and manifold absolute pressure (load). A two-dimensional representation of a typical spark timing table is shown in FIG. 2 for various values of manifold absolute pressure (MAP).

Figure 3:
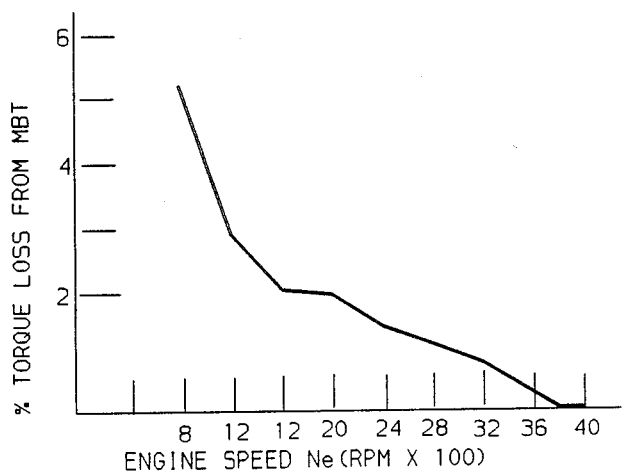
FIG. 3 is a graphical representation of the as-calibrated percent torque loss as a function of engine speed for the engine of FIG. 1 and the spark calibration of FIG. 2.

To the extent that the timing calibration is retarded from the MBT setting, there is a corresponding reduction in the engine output torque, as compared to the MBT torque which would occur with ignition timed at the MBT setting. Such torque reduction or loss has been found to vary primarily as a function of engine speed $N_e$, at least under high engine torque conditions, and is typically so tabulated during engine testing. A graphical representation of the percentage torque loss (from MBT torque) vs. speed for a typical engine is given in FIG. 3. As described below, such information is stored in the memory of control unit 42 for use in carrying out the torque management spark timing control of this invention.

Figure 4:
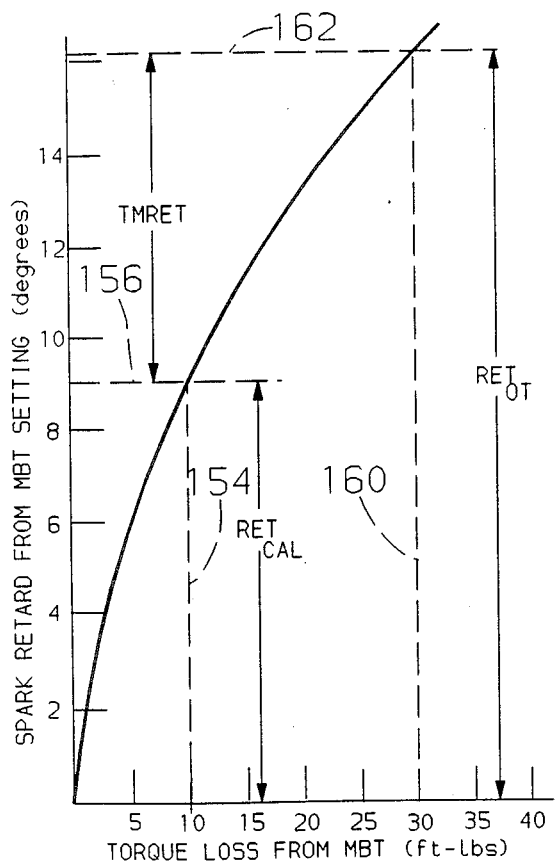
FIG. 4 is a graphical representation of an empirically derived relation between engine torque reduction from MBT torque and spark retard from the MBT setting for a spark ignition engine as shown in FIG. 1.

Central also to the timing control of this invention is the recognition that there is a relatively simple relationship between the amount of spark retard from the MBT setting and the corresponding engine torque reduction from MBT. When expressed in terms of the actual engine torque reduction from MBT, as shown in FIG. 4, the relationship is substantially independent of engine speed, for relatively high engine torque levels. Alternately, the relationship may be expressed in terms of the percentage of torque reduction from MBT—that is, (TORQUE FROM MBT/COMPUTED MBT). In such event, the relationship is substantially independent of both engine speed and torque level. In either case, the relationship provides a basis for correlating the spark timing and torque information available to the control unit 42, as explained below.

Figure 5:
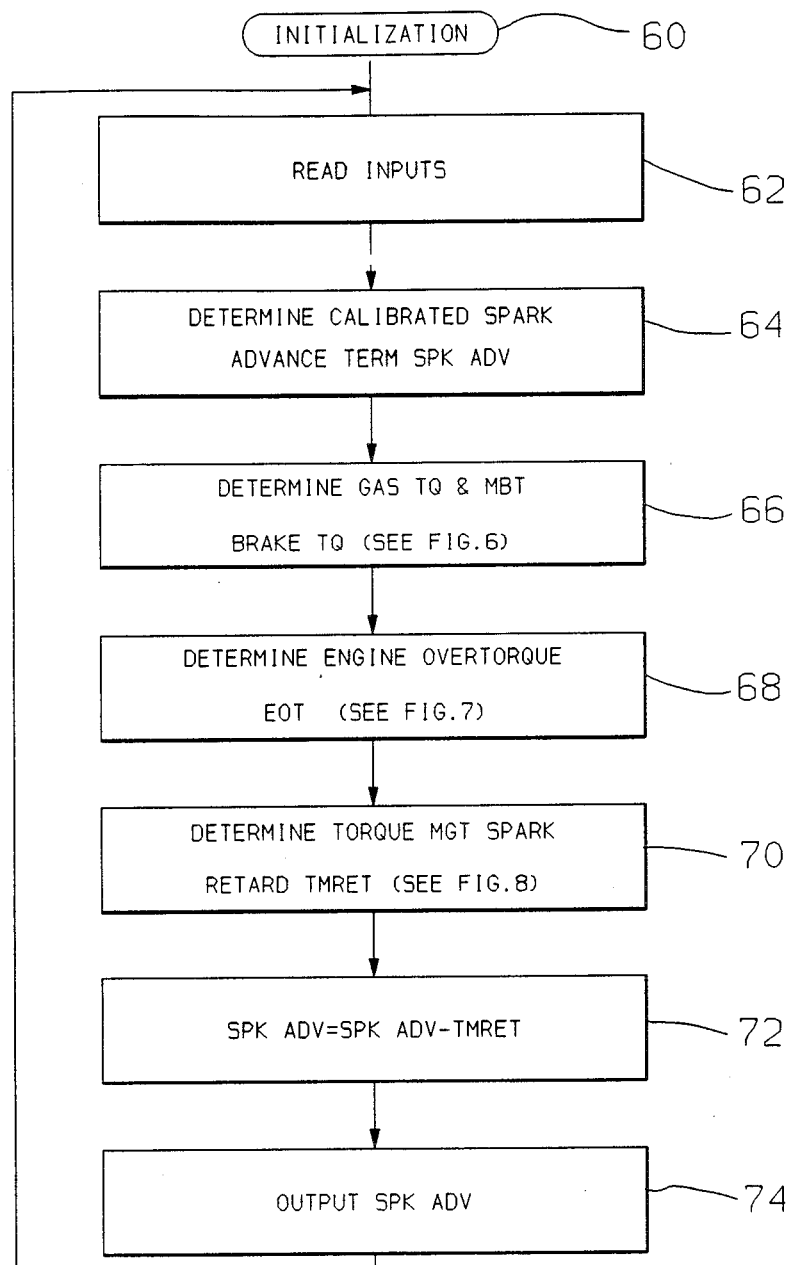
FIGS. 5-8 are flow diagrams representative of computer program instructions executed by the computer-based engine control unit of FIG. 1 in carrying out the control of this invention.
Figure 6:
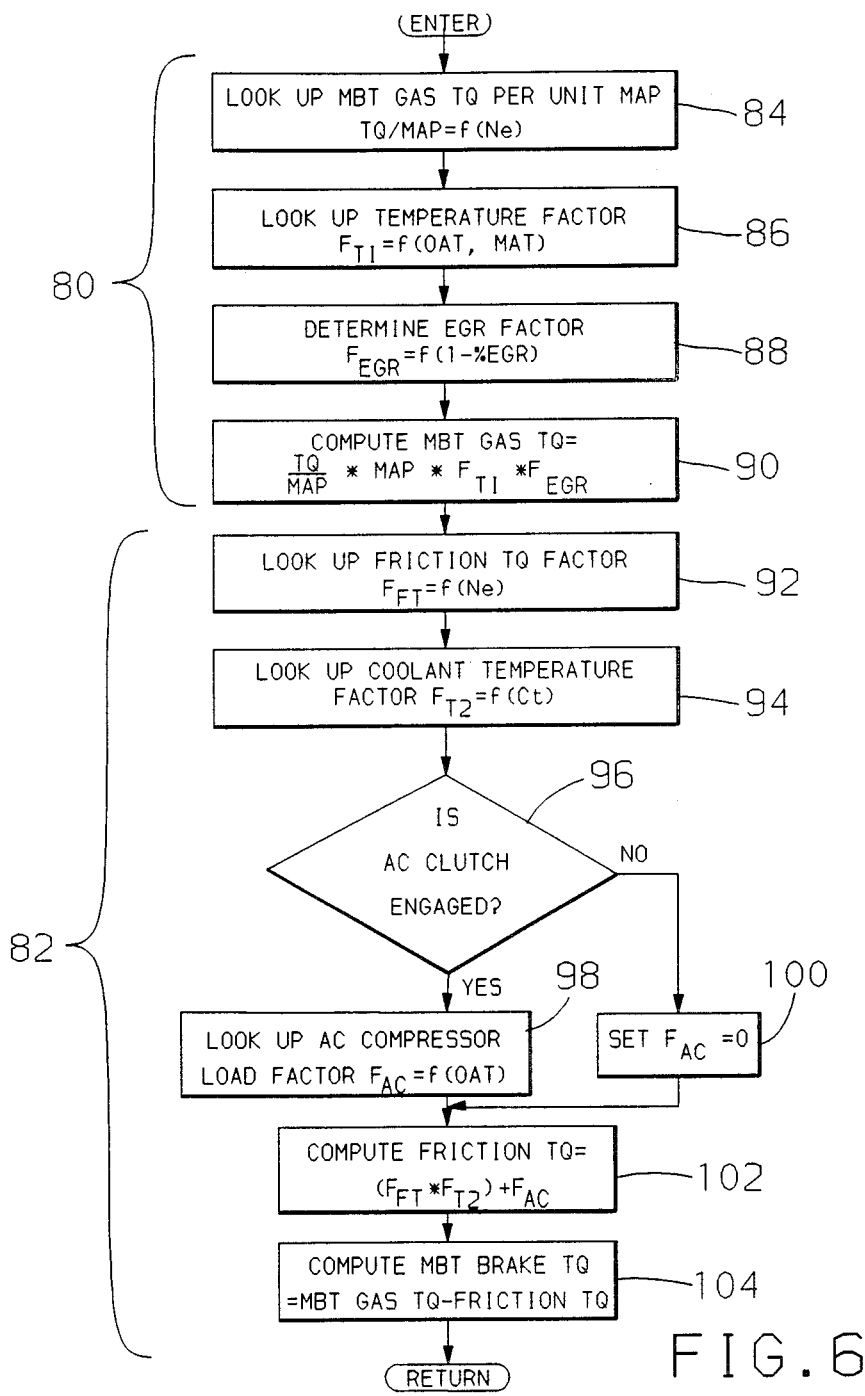
Figure 7:
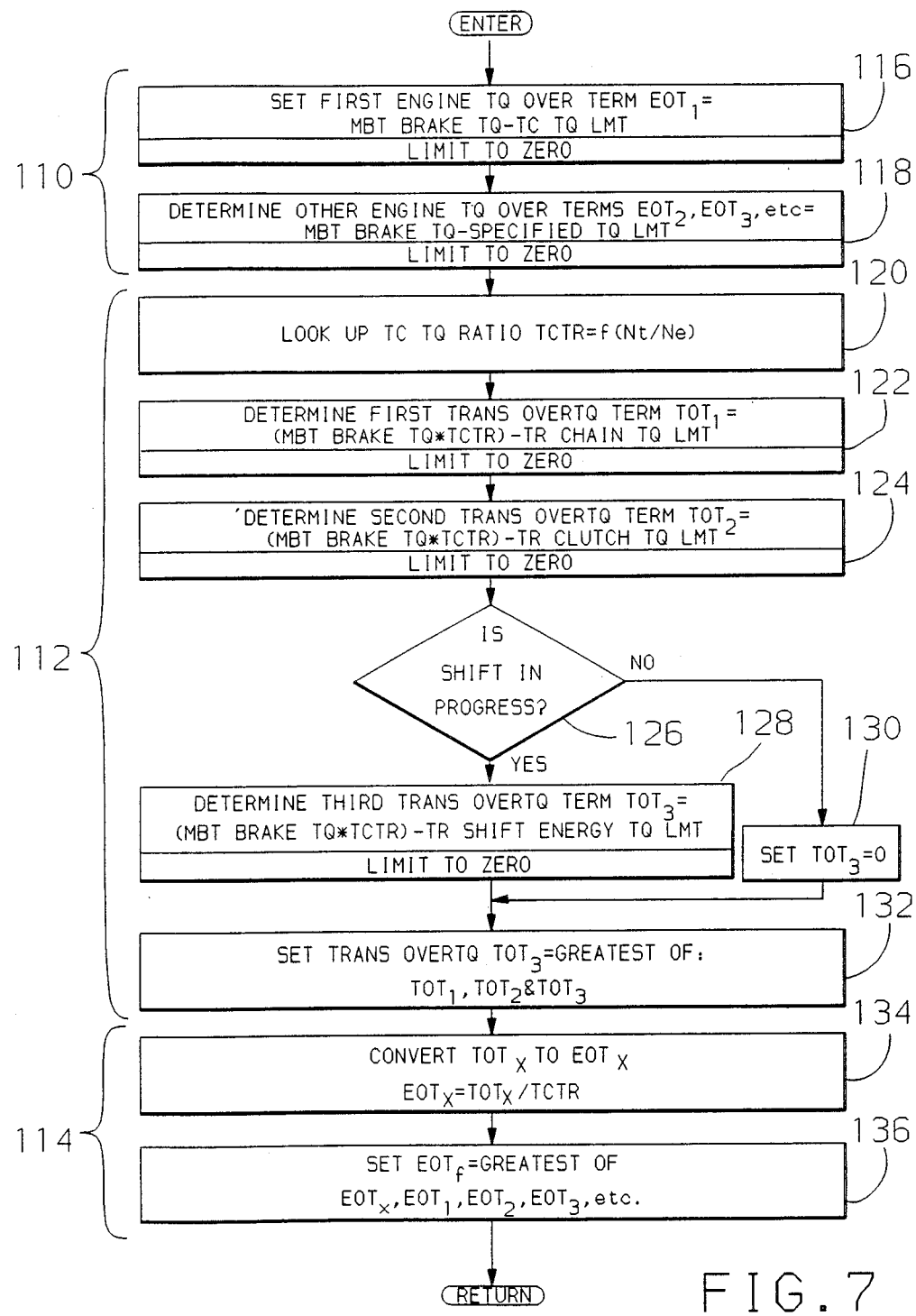
Figure 8:
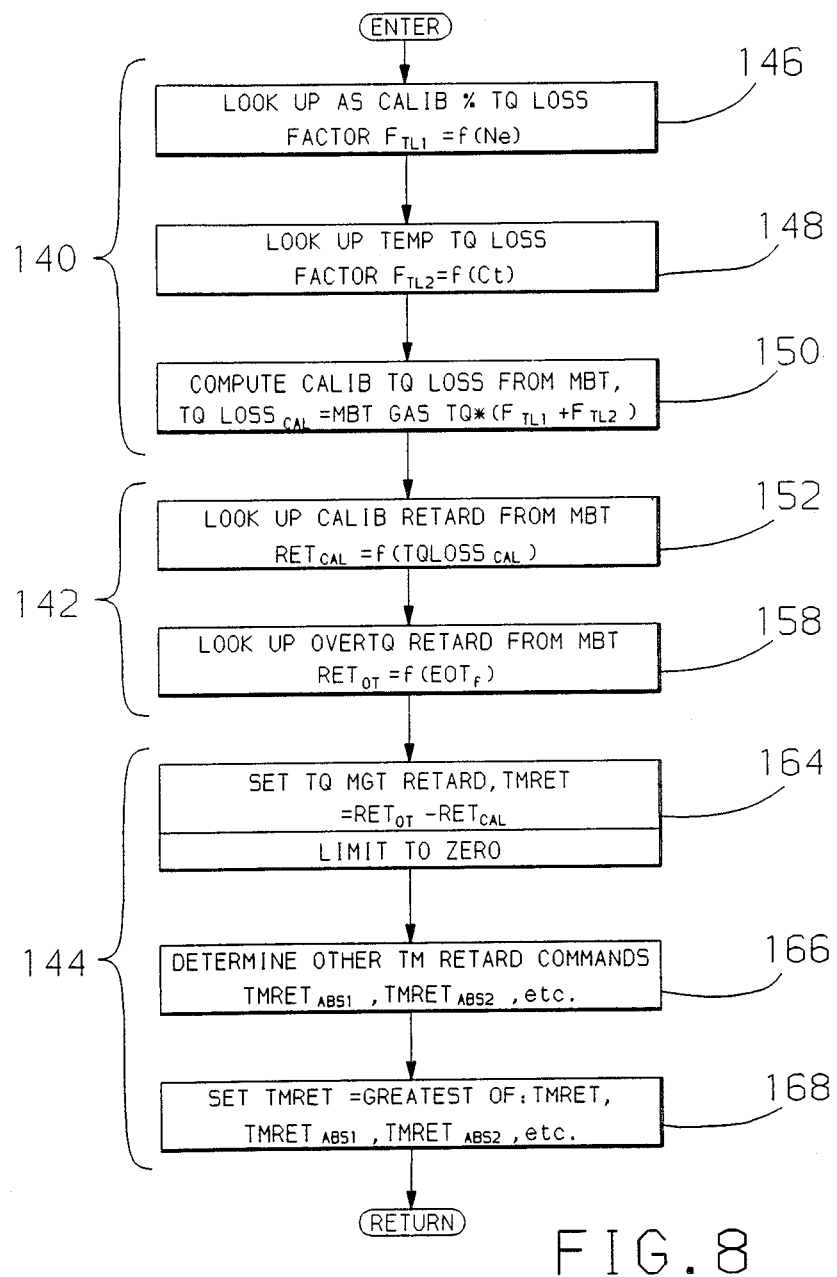

FIGS. 5-8 depict flow diagrams representative of computer program instructions executed by the computer-based engine control unit 42 of FIG. 1 in carrying out the spark timing control of this invention. The flow diagram of FIG. 5 represents an executive or main loop program which directs the operation of a number of subroutines for performing various tasks. The flow diagrams of FIGS. 6-8 represent the subroutines which are pertinent to the control functions of this invention as indicated in FIG. 5.

Referring now more particularly to the main loop flow diagram of FIG. 5, the reference numeral 60 generally designates a series of program instructions executed at the initiation of each period of vehicle operation for initializing the various registers, timers and variables stored in the control unit 42. Thereafter, the instruction blocks 62-74 are repeatedly and sequentially executed as indicated by the flow diagram lines. The broken flow line between blocks 62 and 64 indicates that the program also signals the execution of various other functions such as fuel control, EGR control, etc. which are not particularly relevant to the present invention.

At block 62, the control unit 42 reads the various input signals on lines 44-56, as described in reference to FIG. 1. At block 64, the calibrated spark timing value SPK ADV is read from the calibration table as a function of engine speed Ne and MAP. Block 66 refers to the computation of the MBT engine gas and MBT brake torque values (MBT GAS TQ and MBT BRAKE TQ), such computation being set forth in further detail in the flow diagram of FIG. 6 as indicated. Block 68 refers to the determination of engine overtorque (EOT), such determination being set forth in further detail in the flow diagram of FIG. 7 as indicated. Block 70 refers to the determination of the torque management spark retard term (TMRET), and is set forth in further detail in the flow diagram of FIG. 8 as indicated. At block 72, the final spark timing command SPK ADV is determined according to the difference (SPK ADV−TMRET), and at block 74, the command SPK ADV is supplied to the EST unit 38 on line 40.

Referring now to FIG. 6, it will be seen that the flow diagram thereof is functionally divided into a first portion 80 relating to the computation of the MBT GAS TQ term, and a second portion 82 relating to the computation of the MBT BRAKE TQ term. Computation of the MBT GAS TQ term involves an empirically validated model of the engine 12; computation of the MBT BRAKE TQ term additionally involves an empirically validated model of engine friction and major accessory loading.

In the flow diagram portion 80, the sequence to instruction blocks 84–88 are executed in determine the MBT GAS TQ per unit MAP, an air temperature factor $F_{T1}$, and an EGR factor $F_{EGR}$. The MBT GAS TQ per unit MAP is looked up as a function of engine speed $N_e$, the air temperature factor $F_{T1}$ is looked up in accordance with the greater of the outside air temperature OAT and the manifold air temperature MAT, and the EGR factor $F_{EGR}$ is determined in relation to the commanded %EGR. As indicated at block 90, the MBT GAS TQ term is computed according to the expression:

$$MBT\ GAS\ TQ = \frac{MBT\ GAS\ TQ}{UNIT\ MAP} * MAP * F_{T1} * F_{EGR}$$

In the flow diagram portion 82, the instruction blocks 92 and 94 are executed to determine the friction torque factor $F_{FT}$ and the friction torque coolant temperature factor $F_{T2}$. The factor $F_{FT}$ is looked up as a function of engine speed $N_e$, and the factor $F_{T2}$ is looked up as a function of the coolant temperature $C_t$. If an engine-driven refrigerant compressor clutch (not shown) of a vehicle air conditioning (A/C) system is engaged to run the compressor, as determined at decision block 96, the instruction block 98 is executed to look up an A/C compressor load factor $F_{AC}$ as a function of the outside air temperature OAT. If the compressor clutch is not engaged, the instruction block 100 is executed to set the factor $F_{AC}$ to zero. Finally, the instruction blocks 102 and 104 are executed to compute the FRICTION TQ term according to the expression:

FRICTION TQ = $(F_{FT} * F_{T2}) + F_{AC}$ and to compute the MBT BRAKE TQ term according to the expression:

MBT BRAKE TQ = MBT GAS TQ − FRICTION TQ

Referring now to FIG. 7, it will be seen that the flow diagram thereof is functionally divided into three portions designated by the reference numerals 110, 112 and 114. The first portion 110 pertains to the determination of engine overtorque terms $EOT_1$, $EOT_2$, $EOT_3$, etc. in relation to specified engine output torque constraints. The second portion 112 pertains to the determination of transmission overtorque terms $TOT_1$, $TOT_2$, $TOT_3$, etc. in relation to specified torque converter output torque constraints. The third portion 114 pertains to the identification of the most limiting of the constraints determined in flow diagram portions 110 and 112.

Referring to the flow diagram portion 110, the first engine overtorque term $EOT_1$ is determined at instruction block 116 in relation to the amount by which the MBT BRAKE TQ term exceeds the input torque limit TCTQLMT of the torque converter 14. If the MBT BRAKE TQ is less than the limit TCTQLMT, the engine overtorque term EOT1 is limited to zero, as indicated. As indicated at the instruction block 118, further engine overtorque terms $EOT_2$, $EOT_3$, etc. may be computed in relation to the amount by which MBT BRAKE TQ exceeds other specified engine output torque ($T_o$) limits. Such terms are similarly limited to zero.

Referring to the flow diagram portion 112, the instruction block 120 is first executed to determine a torque multiplication factor TCTR corresponding to the torque ratio of the torque converter 14. Such torque ratio is empirically determined and stored as a function of the speed ratio $N_t/N_e$ across the torque converter 14 as indicated. As indicted at instruction blocks 122, 124 and 128, the factor TCTR is used to convert engine output torque to torque converter output torque (transmission input torque) to enable a direct comparison of the computed torque with various transmission torque constraints.

In the illustrated embodiment, the transmission torque constraints include a chain torque limit, designated TR CHAIN TQ LMT, various steady state (non-shifting) clutch torque limits, designated TR CLUTCH TQ LMT, and various shifting clutch torque limits, designated TR SHIFT ENERGY LMT. Thus, the first transmission overtorque term $TOT_1$ is computed according to the amount by which the product (MBT BRAKE TQ * TCTR) exceeds the chain torque limit TR CHAIN TQ LMT; the second transmission overtorque term $TOT_2$ is computed according to the amount by which the product (MBT BRAKE TQ * TCTR) exceeds the clutch torque limit TR CLUTCH TQ LMT; and the third transmission overtorque term $TOT_3$ is computed according to the amount by which the product (MBT BRAKE TQ * TCTR) exceeds the clutch torque limit TR SHIFT ENERGY LMT. Other transmission torque limits may also be appropriate.

Since the shift energy torque limits are generally lower than the steady state limits, corresponding transmission overtorque terms $TOT_3$ are only computed if a shift is in progress, as indicated at decision block 126. If decision block 126 is answered in the negative, the instruction block 130 is executed to set the shift energy overtorque term $TOT_3$ to zero.

Once all of the transmission overtorque terms have been computed, the instruction block 132 is executed to determine a final transmission overtorque term $TOT_x$ equal to the greatest of the transmission overtorque terms $TOT_1$, $TOT_2$, $TOT_3$, etc.

In flow diagram portion 114, the final transmission overtorque term $TOT_x$ is divided by the instruction block 134 to determine a corresponding engine overtorque value $EOT_x$. The instruction block 136 is then executed to determine a final engine overtorque term $EOT_f$ equal to the greatest of the various engine overtorque values $EOT_x$, $EOT1$, $EOT_2$, $EOT_3$, etc. Such final engine overtorque term $EOT_f$ thus represents the amount by which the MBT BRAKE TQ term exceeds the most limiting of the various engine and drivetrain torque constraints.

Referring now to FIG. 8, it will be seen that the flow diagram thereof is functionally divided into three portions 140, 142 and 144. The first portion 140 determines the torque loss from MBT torque (CALIB TQ LOSS FROM MBT) due to the spark calibration table. The second portion 142 determines the equivalent retard values (CALIB RETARD FROM MBT and OVERTQ RETARD FROM MBT) corresponding to the calibrated torque loss and final engine overtorque terms, CALIB RETARD FROM MBT and $EOT_f$. The third portion 144 determines the additional amount of spark retard, designated torque management retard (TQ MGT RETARD), required to satisfy the most limiting of the engine and drivetrain torque constraints.

In the flow diagram portion 140, the instruction block 146 is first executed to look up a factor $F_{TL1}$ corresponding to the percent of torque loss from MBT caused by retard in the spark calibration table. As indicated in reference to FIG. 2 and 3, such information is typically generated during engine testing and development and is stored in the memory of control unit 42 as a function of engine speed $N_e$. Then the instruction block 148 is executed to look up a temperature torque loss factor $F_{TL2}$ as a function of the coolant temperature $C_t$, which factor is also empirically generated. Finally, the instruction block 150 is executed to compute the calibrated torque loss from MBT, $TQLOSS_{CAL}$, according to the expression:

$$TQLOSS_{CAL} = MBT\ GAS\ TQ * (F_{TL1} + F_{TL2})$$

In the flow diagram portion 142, the instruction block 152 is first executed to look up the calibrated retard from MBT $RET_{CAL}$ as a function of the calibrated torque loss from MBT $TQLOSS_{CAL}$, using the stored relationship graphically depicted in FIG. 4. A representative look up of this type is graphically illustrated in FIG. 4 by the broken lines 154 and 156, where a torque loss of 10 ft-lbs from MBT torque is seen to correspond to a spark retard of 9 degrees from the MBT setting. At instruction block 158, the overtorque retard from MBT, $RET_{OT}$, is looked up as a function of the final engine overtorque term $EOT_f$, again using the stored relationship graphically depicted in FIG. 4. A representative look up of this type is graphically illustrated in FIG. 4 by the broken lines 160 and 162, where an overtorque value of 30 ft-lbs (overtorque is defined in relation to MBT torque) is seen to correspond to a spark retard of 16 degrees from the MBT setting.

In the flow diagram portion 144, the instruction block 164 is first executed to determine the amount of additional retard, if any, for torque management requirements, TMRET, according to the difference between the overtorque retard $RET_{OT}$ and the calibrated retard $RET_{CAL}$. If the calibrated retard is at least as great as the overtorque retard, no additional retard is required, and the torque management retard term TMRET is limited to zero as indicated.

For the exemplary values graphically depicted in FIG. 4, the term TMRET would have a value of 7 degrees. Of the overall retard from MBT of 16 degrees required to satisfy torque management constraints, 9 degrees is inherent in the spark calibration table and the control of this invention would supply the additional 7 degrees of retard.

The instruction block 166 provides for the injection of absolute torque management retard commands, designated $TMRET_{ABS1}$, $TMRET_{ABS2}$, etc. The detection of certain operating conditions, for example, might trigger an absolute retard command (in addition to the calibrated retard) for producing a corresponding engine output torque reduction.

Finally, the instruction block 168 is executed to set the value of the torque management spark retard term TMRET equal to the greatest of TMRET, $TMRET_{ABS1}$, $TMRET_{ABS2}$, etc. As indicted in the main flow diagram of FIG. 5, such value is combined with the spark timing (advance) value from the spark calibration table, and the combined term SPK ADV is supplied to the EST unit 38 for controlling the spark ignition system accordingly.

While this invention has been defined in relation to the illustrated embodiment, it will be understood that various modifications thereto will occur to those skilled in the art and that systems incorporating such modifications may fall within the scope of this invention which is defined by the appended claims.

The embodiments of the invention in which an exclusive property or privilege is claimed are defined as follows:

1. In a spark ignition system for the engine of a motor vehicle drivetrain adapted to initiate combustion in various engine cylinders in accordance with a spark timing control signal supplied thereto, a method of operation comprising the steps of:

looking up a basic spark timing value from a calibration table of empirically determined and previously stored timing values chosen to maximize engine output torque within engine durability and drivability constraints;

computing a MBT torque value corresponding to the engine output torque which would be obtained with a MBT spark timing setting chosen to maximize engine output torque without regard for said engine durability and drivability constraints;

determining a final engine overtorque value corresponding to the amount by which the computed MBT torque value exceeds an engine torque constraint corresponding to a drivetrain-related torque constraint;

determining an overtorque spark retard value representative of the deviation from the MBT spark timing setting which would cause the engine output torque to be reduced from the MBT torque value in the amount of said final engine overtorque value;

determining a calibration spark retard value representative of the deviation from the MBT spark timing setting inherent in said calibration table;

retarding the basic spark timing value in accordance with a supplemental spark retard value determined in relation to the amount by which the overtorque spark retard value exceeds the calibration spark retard value; and supplying a spark timing control signal to said spark ignition system in accordance with the retarded basic spark timing value, thereby to limit the engine output torque in the amount required to satisfy said drivetrain-related torque constraint.

2. A method of operation as set forth in claim 1, wherein the drivetrain includes a power transmission coupled to the engine through a fluid torque converter which increases the engine output torque by a factor which varies in relation to the speed ratio thereacross, and the determination of said final engine overtorque value includes the steps of:

determining a first engine overtorque value determined in relation to the amount by which the computed MBT torque value exceeds an input torque constraint of the torque converter;

measuring a torque converter speed ratio and looking-up a torque multiplication factor in accordance therewith;

determining a transmission overtorque value according to the amount by which the input torque of the transmission exceeds a transmission input torque constraint, as a function of the computed MBT torque value, the torque multiplication factor, and the transmission input torque constraint;

computing a second engine overtorque value corresponding to the transmission overtorque value, as a function of the transmission overtorque value and said torque multiplication factor; and determining said final engine overtorque value according to the greater of said first and second engine overtorque values.

3. The method of operation set forth in claim 2, where the power transmission is shiftable to establish at least two different speed ratios thereacross, and said transmission input torque constraint includes a term which is active during such shifting pertaining to a shift energy torque limit.

4. A method of operation as set forth in claim 1, wherein the overtorque spark retard value is retrieved as a function of the final engine overtorque value from a table of previously stored data relating engine torque reduction from the MBT torque value to corresponding deviations of the engine spark timing from the MBT spark timing setting.

5. A method of operation as set forth in claim 1, wherein the step of determining a calibration spark retard value comprises the steps of:

retrieving a calibration torque loss value from a first table of previously stored data relating the calibration table-related engine torque reduction from the MBT torque value to corresponding variations in an engine operating parameter; and retrieving a calibration spark retard value corresponding to said calibration torque loss value from a second table of previously stored data relating engine torque reduction from the MBT torque value to corresponding deviations of the engine spark timing from the MBT spark timing setting.

6. A method of operation as set forth in claim 1, wherein the engine operating parameter is engine speed.

* * * * *